United States Patent
Yu

(10) Patent No.: US 9,332,178 B2
(45) Date of Patent: May 3, 2016

(54) METHODS OF IMAGE ACQUIRING AND ELECTRONIC DEVICES

(71) Applicant: LENOVO (BEIJING) LIMITED, Beijing (CN)

(72) Inventor: Zhou Yu, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 5 days.

(21) Appl. No.: 13/913,228

(22) Filed: Jun. 7, 2013

(65) Prior Publication Data

US 2013/0329077 A1    Dec. 12, 2013

(30) Foreign Application Priority Data

Jun. 8, 2012    (CN) .......................... 2012 1 0190128

(51) Int. Cl.
| | |
|---|---|
| *H04N 5/228* | (2006.01) |
| *H04N 5/76* | (2006.01) |
| *H04N 5/232* | (2006.01) |

(52) U.S. Cl.
CPC ................................ *H04N 5/23229* (2013.01)

(58) Field of Classification Search
CPC .......... H04N 1/00281; H04N 1/00312; H04N 2201/0055; H04N 5/23229
USPC ................................ 348/208.1, 222.1, 236.1
See application file for complete search history.

(56) References Cited

U.S. PATENT DOCUMENTS

| | | | |
|---|---|---|---|
| 7,440,594 B2 * | 10/2008 | Takenaka ........... | G08B 13/1961 382/118 |
| 2003/0072471 A1 * | 4/2003 | Otsuka ................. | G05D 1/0246 382/103 |
| 2012/0229673 A1 * | 9/2012 | Solomon ................ | H04N 5/217 348/231.99 |
| 2012/0274745 A1 * | 11/2012 | Russell ........................... | 348/46 |

* cited by examiner

*Primary Examiner* — Trung Diep
(74) *Attorney, Agent, or Firm* — Osha Liang LLP

(57) ABSTRACT

Disclosed is a method of image acquiring and an electronic device. The method comprises: obtaining first image purpose information, wherein the first image purpose information corresponds to a first application; determining a first algorithm corresponding to the first image purpose information from at least two algorithms which are different from each other, based on the first image purpose information; and acquiring a first image data for the use of the first application based on the first algorithm.

14 Claims, 2 Drawing Sheets

METHODS OF IMAGE ACQUIRING AND ELECTRONIC DEVICES

TECHNICAL FIELD

The present disclosure relates to a technical field of image processing, in particular to methods of image acquiring and electronic devices.

BACKGROUND

As a popular acquiring means of environment scenes, image collecting apparatuses are applied widely. The image collecting apparatuses may be applied aspects of various fields, such as video chatting, image recognition, teleconferencing, and real time monitoring etc.

The existing image collecting apparatuses collect original image information by an image sensor, and then process images by an image signal processing unit. The purpose of this processing is to obtain an image in which the human eyes are interested. For example, the human eyes like images having variety of color, thus the image signal processing unit needs a great deal of complex operations and modification to process original images, thereby obtaining images having variety of colors. For further example, the human eyes like a portrait having mellow facial features, thus the image signal processing unit will tone down the facial features of the portrait by employing some operations.

Furthermore, various image recognition algorithms may be also use the image processed by the image signal processing unit, to recognize and judge feature points, thereby obtaining information required by a machine. However, based on different application scenes, the information recognized by the image recognition algorithms may be different, for example, obtained landmark building information, text information etc.

In a procedure implementing technical solutions of embodiments of present disclosure, it finds there are following disadvantages in the prior art:

(1) In the prior art, since the original images collected by the image collecting apparatus need to be processed by the image signal processing unit as the images which the human eyes are interested, but the images which the human eyes are interested may generally give prominence to color information of the images but blur profile information, there is a technical problem in which the images collected by the image collecting apparatus lacks essential image information in some applications.

For example, in the image recognition algorithm, exaggerative lines and profiles are needed to maintain recognition accuracy. Since the images processed by the image signal processing unit may typically blur lines and profiles, this results in being lack of profiles and lines information, thus cannot satisfy the need of the image recognition algorithm.

(2) In the prior art, since the original images collected by the image collecting apparatus need to be processed by the image signal processing unit as the images which the human eyes are interested, but such images may lost a great deal of profiles and lines, this results in a lower accuracy for the image recognition algorithm.

SUMMARY

Embodiments of the present disclosure provide methods of image acquiring and electronic devices which may address the technical problem in which images collected by the image collecting apparatus in prior art lacks essential image information in some applications.

On the one hand, an embodiment of the present disclosure provides the following technical solution:

A method of image acquiring includes:

obtaining first image purpose information, wherein, the first image purpose information corresponding to a first application;

determining a first algorithm corresponding to the first image purpose information (e.g., information indicating the purpose of an image) from at least two algorithms which are different from each other, based on the first image purpose information; and acquiring first image data for the use of the first application based on the first algorithm.

Optionally, obtaining the first image purpose information includes:

detecting a type of the first application; and obtaining the first image purpose information based on the type of the first application.

Optionally, obtaining the first image purpose information further includes:

obtaining a first trigger instruction; and obtaining the first image purpose information based on the first trigger instruction.

Optionally, the first image purpose information further includes information related to an application environment of the first image data.

Optionally, in the case that the first image purpose information further includes information which indicates that the first image data is determined to be applied to the video shooting program, determining the first algorithm corresponding to the first image purpose information from at least two algorithms which are different from each other based on the first image purpose information further includes:

determining the first algorithm corresponding to the first image purpose information from at least two algorithms which are different from each other, based on the first image purpose information and a relationship between the algorithms and the image purpose, wherein the first image data to be sent to a video shooting program being obtained by the first algorithm.

Optionally, in the case that the first image purpose information is particularly information which indicates that the first image data is determined to be applied to the image recognition program, determining the first algorithm corresponding to the first image purpose information from at least two algorithms which are different from each other based on the first image purpose information further includes:

determining the first algorithm corresponding to the first image purpose information from at least two algorithms which are different from each other, based on the first image purpose information and the relationship between the algorithms and the image purpose, wherein the first image data to be sent to an image recognition program being obtained by the first algorithm.

Optionally, in the case that the first algorithm is particularly the recognition algorithm which is used when collecting original image data, acquiring the first image data based on the first algorithm particularly includes:

collecting, by an image sensor, an image source based on an recognition algorithm, to obtain the first image data.

Optionally, in the case that the first algorithm is particularly the processing algorithm which is used when processing the collected original image data, acquiring the first image data based on the first algorithm particularly includes:

processing, by an image signal processing unit, the collected original image data based on an processing algorithm, to obtain the first image data.

On the other hand, an embodiment of the present disclosure further provides the following technical solution:

An electronic device includes:

a housing;

an obtaining module positioned on a surface of the housing or inside the housing, and configured to obtain first image purpose information, wherein the first image purpose information corresponding to a first application;

a determining module connected to the obtaining module, and configured to determine a first algorithm corresponding to the first image purpose information from at least two algorithms which are different from each other, based on the first image purpose information; and an acquiring module connected to the determining module, and configured to acquire first image data for the use of the first application, based on the first algorithm.

Optionally, the obtaining module particularly includes:

a detecting unit configured to detect a type of the first application; and a first obtaining unit configured to obtain the first image purpose information based on the type of the first application.

Optionally, the obtaining module particularly includes:

a second obtaining unit configured to obtain a first trigger instruction; and a third obtaining unit configured to obtain the first image purpose information based on the first trigger instruction.

Optionally, the first image purpose information is particularly information related to an application environment of the first image data.

Optionally, the determining module is particularly configured to:

in the case that the first image purpose information is particularly information which indicates that the first image data is determined to be applied to the video shooting program, determine the first algorithm corresponding to the first image purpose information from at least two algorithms which are different from each other, based on the first image purpose information and a relationship between the algorithms and the image purpose, wherein the first image data to be sent to a video shooting program being obtained by the first algorithm.

Optionally, the determining module is particularly configured to:

in the case that the first image purpose information is particularly information which indicates that the first image data is determined to be applied to the image recognition program, determine the first algorithm corresponding to the first image purpose information from at least two algorithms which are different from each other, based on the first image purpose information and the relationship between the algorithms and the image purpose, wherein the first image data to be sent to an image recognition program being obtained by the first algorithm.

Optionally, the obtaining module is particularly configured to:

in the case that the first algorithm is particularly the recognition algorithm which is used when collecting original image data, collect, by an image sensor, an image source based on an recognition algorithm, to obtain the first image data.

Optionally, the obtaining module is particularly configured to:

in the case that the first algorithm is particularly the processing algorithm which is used when processing the collected original image data, process, by an image signal processing unit, the collected original image data based on an processing algorithm, to obtain the first image data.

One or more technical solutions provided by embodiments of the present disclosure at least have the following technical effects or advantages:

(1) In embodiments of the present disclosure, since the first image purpose information is different from each other, the first image data is obtained by different algorithm. That is to say, different image data are obtained using different algorithms based on different application environments, for example, image color is optimized, and lines are toned down, if the image is provided to be viewed by the human eyes. However, a prominence will be given to profiles and lines, if the image is provided to be used by the image recognition algorithm, regardless of any application environment. It is assured that the best image information may be obtained to be used by the first application.

(2) In embodiments of the present disclosure, since the first image which is used by the image recognition program may be determined from at least two algorithms which are different from each other. For example, this algorithm is used to decolorize, increase gains, and enhance edges etc., when the first image data is applied to the image recognition program, thereby improving the accuracy of the image recognition algorithm.

(3) In embodiments of the present disclosure, since the first image which is used by the video shooting program may be determined from at least two algorithms which are different from each other. For example, this algorithm is used to enhance color, tone down lines etc., when the first image data is applied to the video shooting program, thereby the user experience may be assured in the case of assuring the accuracy of the image recognition algorithm.

(4) In embodiments of the present disclosure, since the image sensors are different from each other, the first image data may be obtained by the different original data obtained from the image source. Since the first image data may be obtained from the image source directly, it is farthest assured that essential image information can not be lost in a certain application environment.

(5) In embodiments of the present disclosure, since the image processing units are different from each other, the original image is processed as different image data, thus the hardware environments of the image collecting apparatus will not be increased. Accordingly, in case of the costs not being increased, it is assured that the best image information may be obtained in any application environments.

DETAILED DESCRIPTION OF THE PREFERRED EMBODIMENTS

Embodiments of the present disclosure provide methods of image acquiring and electronic devices which may address the technical problem in which images collected by the image collecting apparatus in prior art lacks essential image information in some applications, and guarantee that the best image information may be obtained in any application environments.

The technical solutions of embodiments of the present disclosure have a following overall aspect, in order to address the above problems:

first image data may be obtained using different algorithms based on different application environments, when the first image data to be applied to various application environments are obtained.

For example, the algorithms which enhance color, tone down lines may be used to satisfy the need of human eyes viewing, if the first image data is applied to a video chatting program.

However, the algorithms which increase gain, enhance profile may be used to assure the accuracy of an image recognition program, if the first image data is applied to the image recognition program.

A detailed description will be given to the particular embodiments of the present disclosure with reference to the figures, such that one skilled in the art may understand the solution of the present disclosure better.

An embodiment of the present disclosure provides a method of image acquiring. The method of image acquiring may be applied in various application environments, such as image recognition, video chatting, real time monitoring etc. An electronic device of the method of image acquiring may be an electronic device which contains an image collecting apparatus, such as a digital camera, a mobile phone, a computer etc.

Figure 1:
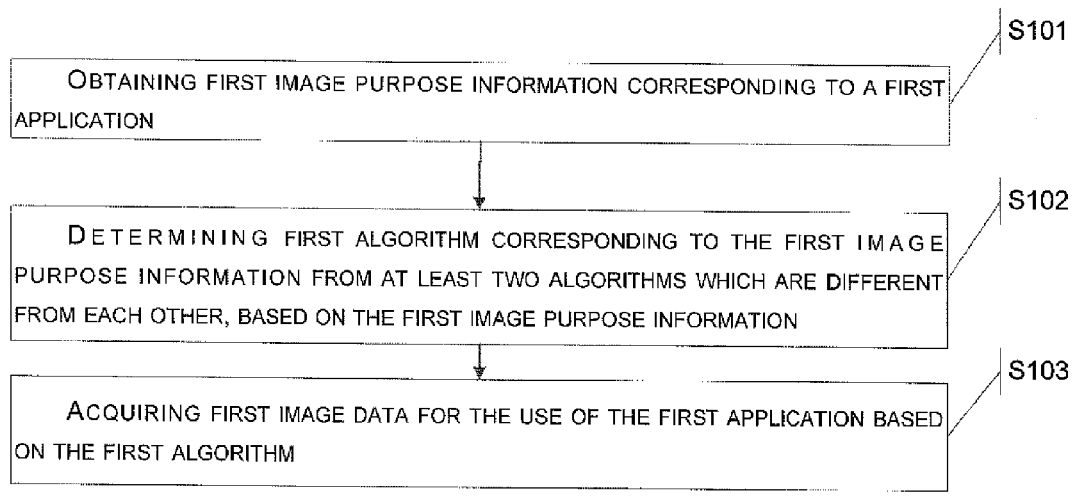
FIG. 1 is a schematic flowchart of a method of image acquiring in an embodiment of the present disclosure.

As shown in FIG. 1, the method of image acquiring includes the following steps.

In step S101, first image purpose information is obtained, wherein the first image purpose information corresponds to a first application;

In particular implementation, the first image purpose information is particularly information related to an application environment of the first image data obtained by the method of image acquiring.

Particularly, the application environment also corresponds to the first application.

For example, the application environment of the first image data is a video chatting, if the first image data is to be applied to a video chatting program.

Also, for example, the application environment of the first image data is an image recognition program, if the first image data is to be applied to an image recognition program.

Of course, in particular implementation, the application environments of the first image data is not limited to both cases above. The present disclosure does not limit the environment to which the first image data is applied.

In particular implementation, the first image purpose information may be obtained by various methods. Two methods are explained as follows. Naturally, the particular implementation is not limited to these two methods.

Figure 2:
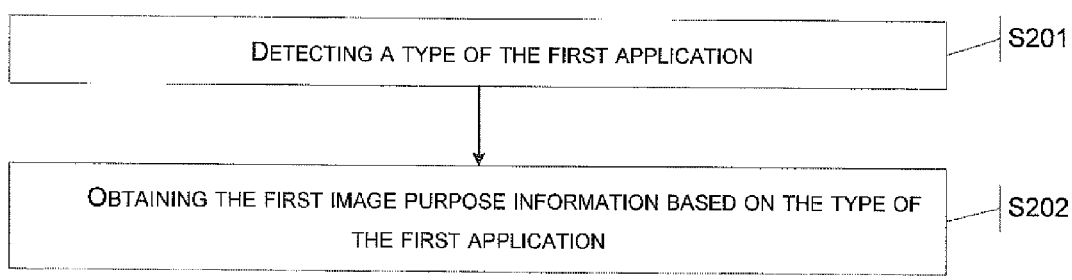
FIG. 2 shows a schematic flowchart of a first method for acquiring first image purpose information in an embodiment of the present disclosure.

As for the first method, as shown in FIG. 2, a particular implementation is as follow:

In step S201, a type of the first application is detected.

For example, at time T1, a user A is making a video chatting with a user B through a video shooting program, the computer used by the user A may detect the above information, then the first application may be determined as the video shooting program.

Also, for example, at time T2, a user C is performing vehicle license plate (number plate) recognition on the first image data by applying an image recognition program, then the first application may be the image recognition program.

After step S201 is performed, proceeding to step S202, in which the first image purpose information is obtaining, based on the type of the first application.

The first image purpose information may be determined as information which indicates that the first image data is to be applied to the video shooting program, if the first application obtained based on step S201 is the video shooting program.

The first image purpose information may be determined as information which indicates that the first image data is to be applied to the image recognition program, if the first application obtained based on step S201 is the image recognition program.

Naturally, in particular implementation, the first image purpose information is not limited to both cases above.

The application environment of the first image data may be detected automatically using the above method, thereby automatically adjusting the first image purpose information. Accordingly, the method of the embodiments of the present disclosure can obtain the best image information in any environments without lost of the obtained image information caused by negligence of the user.

Figure 3:
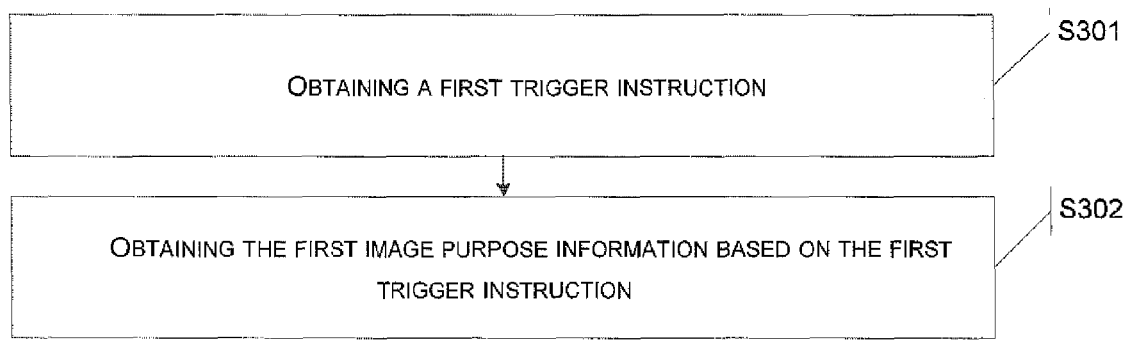
FIG. 3 shows a schematic flowchart of a second method for acquiring the first image purpose information in an embodiment of the present disclosure.

As for the second method, as shown in FIG. 3, a particular implementation is as follow.

In step S301, a first trigger instruction is obtained.

In particular implementation, the first trigger instruction may be obtained using various methods, and each of first trigger instructions corresponds to a piece of first image purpose information.

For example, a number of buttons is positioned on the electronic device implementing of the method of image collecting, each of buttons corresponds to one of first trigger instructions, and then the user clicks different buttons to trigger different, first trigger instructions.

Also, or a plurality of applications may be set, each of applications corresponds to one of first trigger instruction, and then different, first trigger instructions may be triggered based on the selected application.

Naturally, the first trigger instruction may be obtained using the other way.

After the first trigger instruction is obtained by step S301, proceeding to step S302, in which the first image purpose information is obtained based on the first trigger instruction.

Since the first trigger instruction corresponds to the first image purpose information, after obtaining the first trigger instruction, first image purpose information may be obtained correspondingly.

The first image purpose information may be obtained using the above method. This is not limited to the image application environment, thereby its application range becomes wider, and its operation is convenient.

After the first image purpose information is obtained based on step S101, proceeding to step S102, in which a first algorithm corresponding to the first image purpose information is obtained from at least two algorithms which are different from each other, based on the first image purpose information.

Since the first image purpose information are different, the application environments of the first image data are different, thus the algorithms used by the first image data are different, the two kinds of the first image purpose information based on step S101 are exampled to introduce step S102.

(1) In the case that the first image purpose information is particularly information which indicates that the first image data is determined to be applied to the video shooting program, determining the first algorithm corresponding to the first image purpose information from at least two algorithms which are different from each other based on the first image purpose information particularly includes:

determining the first algorithm corresponding to the first image purpose information from at least two algorithms which are different from each other, based on the first image purpose information and a relationship between the algorithms and the image purpose, wherein, the first image data to be sent to a video shooting program being obtained by the first algorithm.

Particularly, the algorithm which is suitable for the video shooting program is selected when selecting the first algorithm, that is the algorithm suitable for human eyes viewing such as giving prominence to a foreground, and blurring background is selected, if the first image data is to be applied to the video shooting program.

(2) In the case that the first image purpose information is particularly information which indicates that the first image data is determined to be applied to the image recognition program, determining the first algorithm corresponding to the first image purpose information from at least two algorithms which are different from each other based on the first image purpose information particularly includes:

determining the first algorithm corresponding to the first image purpose information from at least two algorithms which are different from each other, based on the first image purpose information and the relationship between the algorithms and the image purpose, wherein the first image data to be sent to an image recognition program being obtained by the first algorithm.

Particularly, the algorithm which is suitable for the image recognition program is selected when selecting the first algorithm, that is the algorithm suitable for machine processing such as gain increasing, and profiles enhancement are selected, if the first image data is to be applied to the image recognition program.

After the first algorithm is obtained by step S102, proceeding to step S103, in which the first image data is acquired for the use of the first application, based on the first algorithm.

In particular implementation, the first image data may be obtained by various methods. Two methods are explained as follows. Naturally, the particular implementation is not limited to these two methods.

As for the first method, in the case that the first algorithm is particularly the recognition algorithm which is used when collecting original image data, acquiring the first image data based on the first algorithm particularly includes:

collecting, by an image sensor, an image source based on an recognition algorithm, to obtain the first image data.

Particularly, the image collecting apparatus may have many image sensors, for example, one image sensor may be set based on the image recognition program. This image sensor puts importance to collect profiles, lines etc. information when it collects the original image data. A further image sensor may be set based on the video chatting program, this image sensor puts importance to collect color etc. information when it collects the original image data. Naturally, the other sensor may be also used. Different sensors may be used based on different, the first algorithm, to obtain the first image data having different features for the use of different, the first application.

The first image data is obtained using the above solutions. Since the first image data required by various applications are directly collected on the image source, the lost of the original image information is smaller. It is assured that the image information of the first image data required by various applications is obtained accurately.

As for the second method, in the case that the first algorithm is particularly the processing algorithm which is used when processing the collected original image data, acquiring the first image data based on the first algorithm particularly includes:

processing, by an image signal processing unit, the collected original image data based on an processing algorithm, to obtain the first image data.

Particularly, the image collecting apparatus may have only one image sensor, the original images collected by the image sensor are the same, but the image collecting unit contains a plurality of image signal processing units. The different image signal processing units are used to process the original image based on different, first algorithm to obtain the first image data.

The first image data is obtained using the above solutions. Since the hardware structure of the image collecting apparatus is not needed to be changed, it is assured that the best image information can be obtained in a plurality of application environments without increasing the costs.

Naturally, in particular implementation, the first image data is also obtained by combining the both way above. Particularly, firstly, the best original image information which satisfies the first image purpose information may be obtained by the image sensor, and then the best original image information is processed by the image signal processing unit based on the first image purpose information, to further satisfy the requirement of the application environment.

A further embodiment of the present disclosure provides an electronic device implementing the above method of image acquiring. The electronic device may be an electronic device which contains the image collecting apparatus, such as a computer, a mobile phone, and a digital camera. The present disclosure does not limit the type of the electronic device.

Figure 4:
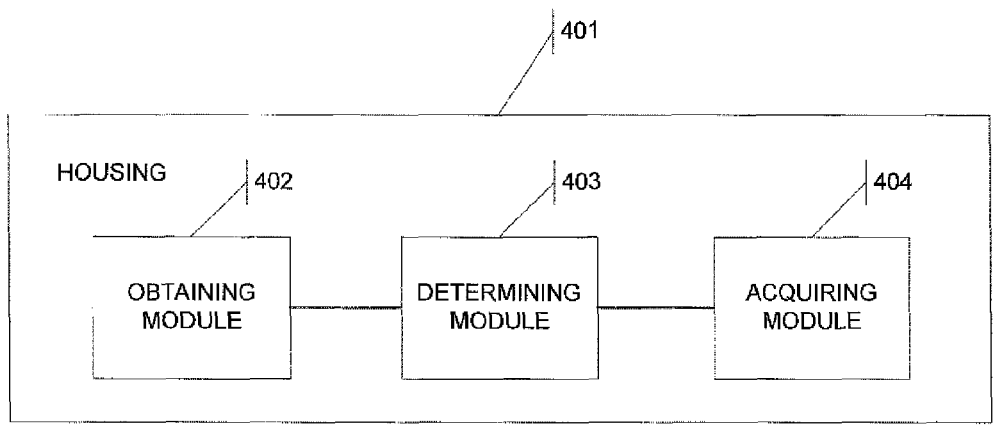
FIG. 4 is a schematic structure diagram of an electronic device in an embodiment of the present disclosure.

As shown in FIG. 4, the electronic device comprises:

a housing 401;

an obtaining module 402 positioned on a surface of the housing or inside the housing, and configured to obtain a first image purpose information, wherein the first image purpose information corresponds to a first application.

In particular implementation, the first image purpose information is particularly information related to an application environment of the first image data.

Particularly, the application environment also corresponds to the first application.

For example, the application environment of the first image data is a video chatting, if the first image data is to be applied to a video chatting program.

Also, for example, the application environment of the first image data is an image recognition program, if the first image data is to be applied to an image recognition program.

Of course, in particular implementation, the application environments of the first image data are not limited to both cases above. The present disclosure does not limit the environment to which the first image data is applied.

In particular implementation, the obtaining module 402 may contain various structures. Two structures are explained as follows. Naturally, the particular implementation is not limited to these two structures.

As for the first structure, the obtaining module 420 particularly includes:

a detecting unit configured to detect a type of the first application;

for example, at time T1, a user A is making a video chatting with a user B through a video shooting program, the computer used by the user A may detect the above information, then the first application may be determined as the video shooting program;

also, for example, at time T2, a user C is performing a license plate recognition on the first image data by applying an image recognition program, then the first application may be the image recognition program.

A first obtaining unit is configured to obtain the first image purpose information, based on the type of the first application.

The first image purpose information may be determined as information which indicates that the first image data is to be applied to the video shooting program, if the first application detected by the detecting unit is the video shooting program.

The first image purpose information may be determined as information which indicates that the first image data is to be applied to the image recognition program, if the first application detected by the detecting unit is the image recognition program.

Naturally, in particular implementation, the first image purpose information is not limited to both cases above.

The application environment of the first image data may be detected automatically using the obtaining module 402 combined by the above function modules, thereby automatically adjusting the first image purpose information. Accordingly, the method of the embodiments of the present disclosure can obtain the best image information in any environments without lost of the obtained image information caused by negligence of the user.

As for second structure, the obtaining module 402 particularly comprises:

a second obtaining unit configured to obtain a first trigger instruction.

In particular implementation, the second obtaining module may use various methods to obtain the first trigger instruction, and each of first trigger instructions corresponds to a piece of the first image purpose information.

For example, a number of buttons is positioned on the electronic device implementing of the method of image collecting, each of buttons corresponds to one of first trigger instructions, and then the user clicks respective buttons to trigger different, first trigger instructions.

Also, or a plurality of applications may be set, each of applications corresponds to one of first trigger instruction, and then different, first trigger instructions may be triggered based on the selected application.

Naturally, the first trigger instruction may be is obtained by the other method.

A third obtaining unit is configured to obtain the first image purpose information based on the first trigger instruction.

Since the first trigger instruction corresponds to the first image purpose information, after the second obtaining unit obtains the first trigger instruction, first image purpose information may be obtained by the third obtaining unit correspondingly.

The obtaining module 402 combined by the above function modules is not limited to the image application environment, thereby its application range become wider, and its operation is convenient.

A determining module 403 is connected to the obtaining module, configured to determine a first algorithm corresponding to the first image purpose information from at least two algorithms which are different from each other, based on the first image purpose information.

Since the first image purpose information are different from each other, the functions of the determining module 403 are different, the two types of the first image purpose information obtained by the obtaining module 401 are exampled to introduce the function of the obtaining module 401. However, in particular implementation, this is not limited to these two functions.

As for the first type, in the case that the first image purpose information is particularly information which indicates that the first image data is determined to be applied to the video shooting program, the determining module 403 is particularly configured to:

determine the first algorithm corresponding to the first image purpose information from at least two algorithms which are different from each other, based on the first image purpose information and a relationship between the algorithms and the image purpose, wherein the first image data to be sent to a video shooting program being obtained by the first algorithm.

Particularly, the algorithm which is suitable for the video shooting program is selected when selecting the first algorithm, that is the algorithm suitable for human eyes viewing such as giving prominence to a foreground, and blurring background is selected, if the first image data is to be applied to the video shooting program.

As for the second type, in the case that the first image purpose information is particularly information which indicates that the first image data is determined to be applied to the image recognition program, the determining module 403 is particularly configured to:

determine the first algorithm corresponding to the first image purpose information from at least two algorithms which are different from each other, based on the first image purpose information and the relationship between the algorithms and the image purpose, wherein the first image data to be sent to an image recognition program being obtained by the first algorithm.

Particularly, the algorithm which is suitable for the image recognition program is selected when selecting the first algorithm, that is the algorithm suitable for machine processing such as gain increasing, and profiles enhancement is selected, if the first image data is to be applied to the image recognition program.

An acquiring module 404 is connected to the determining module, configured to acquire a first image data for the use of the first application, based on the first algorithm.

In particular implementation, based on different cases, the functions of the acquiring module 404 are different, and the two cases are exampled as follow. However, in particular implementation, this is not limited to these two functions.

As for the first case, in the case that the first algorithm is particularly the recognition algorithm which is used when collecting original image data, the acquiring module 404 is particularly adapted to:

collect, by an image sensor, an image source based on a recognition algorithm, to obtain the first image data.

Particularly, the image collecting apparatus may have many image sensors, for example, one image sensor may be set based on the image recognition program, this image sensor puts importance to collect profiles, lines etc. information when it collects the original image data; and a further image sensor may be set based on the video chatting program, this image sensor puts importance to collect color etc. information when it collects the original image data. Naturally, the other sensor may be also used. The acquiring module 404 uses different sensors based on different, the first algorithm, to obtain the first image data having different features for the use of different, first application.

Since the first image data required by various applications are directly collected on the image source, the lost of the original image information is smaller, it is assured that the image information of the first image data required by various applications is obtained accurately, when the acquiring module 404 uses the above solution to obtain the first image data.

As for the second case, in the case that the first algorithm is particularly the processing algorithm which is used when processing the collected original image data, the acquiring module 404 is particularly adapted to:

process, by an image signal processing unit, the collected original image data based on an processing algorithm, to obtain the first image data.

Particularly, the image collecting apparatus may have only one image sensor, the original images collected by the image sensor are the same, but the image collecting unit contains a plurality of image signal processing units. The obtaining module 404 uses the different image signal processing units to process the original image based on different, first algorithm to obtain the first image data.

The obtaining module 404 uses the above solutions to obtain the first image data. Since the hardware structure of the image collecting apparatus is not needed to be changed, it is assured that the best image information can be obtained in a plurality of application environments without increasing the costs.

Naturally, in particular implementation, the first image data is also obtained by combining the both way above. Particularly, firstly, the best original image information which satisfies the first image purpose information may be obtained by the image sensor, and then the best original image information is processed by the image signal processing unit based on the first image purpose information, to further satisfy the requirement of the application environment.

One or more technical solutions provided by embodiments of the present disclosure at least have the following technical effects or advantages:

(1) In embodiments of the present disclosure, since the first image purpose information is different, the first image data is obtained by different, the first algorithm. That is to say, different image data are obtained using different algorithms based on different application environments, for example, image color is optimized, and lines are toned down, if the image is provided to be viewed by the human eyes; however, an prominence will be given to profiles and lines, if the image is provided to be used by the image recognition algorithm, regardless of any application environments, it is assured that the best image information may be obtained to be used by the first application.

(2) In embodiments of the present disclosure, since the first image which is configured to be used by the image recognition program may be determined from at least two algorithms which are difference from each other, for example, this algorithm is used to decolorize, increase gains, and enhance edges etc., when the first image data is applied to the image recognition program, thereby improving the accuracy rate of the image recognition algorithm.

(3) In embodiments of the present disclosure, since the first image which is configured to be used by the video shooting program may be determined from at least two algorithms which are difference from each other, for example, this algorithm is used to enhance color, tone down lines etc., when the first image data is applied to the video shooting program, thereby the user experience may be assured in the case of assuring the accuracy rate of the image recognition algorithm.

(4) In embodiments of the present disclosure, since the image sensors are different from each other, the first image data may be obtained by the different original data obtained from the image source; since the first image data may obtained from the image source directly, it is farthest assured that essential image information can not be lost in a certain application environment.

(5) In embodiments of the present disclosure, since the image processing units are different from each other, the original image is processed as a different, first image data, thus the hardware environments of the image collecting apparatus will not be increased. Accordingly, in case of the costs not being increased, it is assured that the best image information may be obtained in any application environments While some embodiments of the present disclosure have been described, it should be noted that many changes and modifications can be made by those skilled in the art when obtaining the inventive concept. Thus, the claims are only intended to contain the preferred embodiments of the present disclosure and fall in the changes and modifications of the scope of the present disclosure.

Clearly, many changes and modifications can be made by those skilled in the art without departing from the principle of the present disclosure. Thus, these modifications and variations are encompassed by the scope of the present disclosure, if these modifications and variations of the present disclosure belong to the scope of the claims and equivalents of them.

What is claimed is:

1. A method of image acquiring in an electronic device, comprising:
   before acquiring an image data,
   obtaining image purpose information indicating an application program installed in the electronic device by to which the image data is to be used; and
   selecting, based on the obtained image purpose information, an algorithm corresponding to the obtained image purpose information from at least two algorithms which are different from each other, wherein different algorithms correspond to different image purposes associated with different application programs installed in the electronic device;
   acquiring the image data; and
   processing the acquired image data using the selected algorithm, wherein the processed image data are suitable for use by the indicated application program.

2. The method according to claim 1, wherein the obtaining comprises:
   detecting a type of the application program; and
   obtaining the image purpose information based on the detected type of the application program.

3. The method according to claim 1, wherein the obtaining comprises:
   obtaining a trigger instruction; and
   obtaining the image purpose information based on the obtained trigger instruction.

4. The method according to claim 1, wherein in the case that the application program is a video shooting program, the obtained image purpose information indicates that the image data is to be used by the video shooting program, and said selecting comprises:
   selecting an algorithm so that the image data processed using the selected algorithm are suitable for use by the video shooting program.

5. The method according to claim 1, wherein in the case that the application program an image recognition program, the obtained image purpose information indicates that the image data is to be used by the image recognition program, and said selecting comprises:
   selecting an algorithm so that the image data processed using the selected algorithm are suitable for use by the image recognition program.

6. The method according to claim 1, wherein in the case that the selected algorithm is a recognition algorithm which is used when collecting original image data, the acquiring and the processing comprise:
   collecting, by an image sensor, an original image data; and
   processing the original image data using the recognition algorithm to obtain the processed image data.

7. The method according to claim 1, wherein in the case that the selected algorithm is a processing algorithm which is used when processing collected original image data, the processing comprises:
   processing, by an image signal processing unit, the collected original image data using a processing algorithm.

8. An electronic device comprising:
   a housing;
   an obtaining module positioned on a surface of the housing or inside the housing, and configured to obtain image purpose information indicating an application program installed in the electronic device by which the image data is to be used, before the image data is acquired;
   a determining module connected to the obtaining module, and configured to, before the image data is acquired, selecting an algorithm corresponding to the obtained image purpose information from at least two algorithms which are different from each other, based on the obtained image purpose information, wherein different algorithms correspond to different image purposes associated with different application programs installed in the electronic device;
   an acquiring module connected to the selecting module, and configured to acquire the image data; and
   a processing module connected to the acquiring module, configured to process the acquired image data using the selected algorithm, wherein the processed image data are suitable for use by the indicated application program.

9. The electronic device according to claim 8, wherein the obtaining module comprises:
   a detecting unit configured to detect a type of the application program; and
   a first obtaining unit configured to obtain the image purpose information based on the detected type of the application program.

10. The electronic device according to claim 8, wherein the obtaining module comprises:
    a second obtaining unit configured to obtain a trigger instruction; and
    a third obtaining unit configured to obtain the image purpose information based on the obtained trigger instruction.

11. The electronic device according to claim 8, wherein in the case that the application program is a video shooting program installed in the electronic device, the determining module is configured to:
    select an algorithm so that the image data processed using the selected algorithm are suitable for use by the video shooting program.

12. The electronic device according to claim 8, wherein in the case that the application program is an image recognition program installed in the electronic device, the determining module is configured to:
    select an algorithm so that the image data processed using the selected algorithm are suitable for use by the image recognition program.

13. The electronic device according to claim 8, wherein in the case that the selected algorithm is a recognition algorithm which is used when collecting original image data, the processing module is configured to:
    process the image data collected by an image sensor using the recognition algorithm.

14. The electronic device according to claim 8, wherein in the case that the selected algorithm is a processing algorithm which is used when processing collected original image data, the processing module is configured to:
    process, through an image signal processing unit, the collected original image data using the processing algorithm.

* * * * *